(12) United States Patent
Ahn

(10) Patent No.: US 10,409,967 B2
(45) Date of Patent: Sep. 10, 2019

(54) METHOD AND SYSTEM FOR CONTROL OF COMPUTING DEVICES

(71) Applicant: HAH, Inc., New Hartford, NY (US)

(72) Inventor: Heather Ahn, New Hartford, NY (US)

(73) Assignee: HAH, Inc., New Hartford, NY (US)

( * ) Notice: Subject to any disclaimer, the term of this patent is extended or adjusted under 35 U.S.C. 154(b) by 0 days.

(21) Appl. No.: 14/740,442

(22) Filed: Jun. 16, 2015

(65) Prior Publication Data

US 2016/0371474 A1    Dec. 22, 2016

(51) Int. Cl.
*G06F 21/31* (2013.01)
*G06F 21/62* (2013.01)
*H04L 29/06* (2006.01)
*G06F 21/60* (2013.01)

(52) U.S. Cl.
CPC .......... *G06F 21/31* (2013.01); *G06F 21/604* (2013.01); *G06F 21/629* (2013.01); *G06F 21/6218* (2013.01); *G06F 21/6245* (2013.01); *H04L 63/102* (2013.01); *G06F 2221/2149* (2013.01)

(58) Field of Classification Search
None
See application file for complete search history.

(56) References Cited

U.S. PATENT DOCUMENTS

| | | | | |
|---|---|---|---|---|
| 8,863,232 B1 * | 10/2014 | Tidd | ................. | G06F 17/30165 713/151 |
| 9,369,433 B1 * | 6/2016 | Paul | .................... | H04L 63/0227 |
| 2004/0015874 A1 * | 1/2004 | Ungar | ................. | G06F 11/3636 717/127 |
| 2009/0132718 A1 * | 5/2009 | Groll | ..................... | H04W 12/08 709/229 |
| 2009/0158011 A1 * | 6/2009 | Jennings | ................. | G06F 21/53 712/220 |
| 2011/0219229 A1 * | 9/2011 | Cholas | .................... | G06F 21/00 713/168 |
| 2011/0236872 A1 * | 9/2011 | Taylor | .................... | G06Q 10/06 434/350 |
| 2011/0237221 A1 * | 9/2011 | Prakash | ................. | H04L 63/20 455/411 |

(Continued)

OTHER PUBLICATIONS

"Norton Family, NF Product Manual" copyright 2012.*

(Continued)

*Primary Examiner* — Lynn D Feild
*Assistant Examiner* — Richard A McCoy
(74) *Attorney, Agent, or Firm* — Bond Schoeneck & King, PLLC; Blaine Bettinger; George R. McGuire

(57) ABSTRACT

Systems and methods for limiting a user's access to a specific subset of a plurality of software applications installed on a computing device. A method includes the steps of: (i) activating a master application by a master user, where the master application allows access only to the specific subset of the plurality of software applications installed on the computing device, and further where the master application cannot be deactivated without authorization from the master user; (ii) accessing, from within the master application, one or more of the subset of software applications by an authorized user; (iii) returning to the master application or accessing a second of the subset of software applications; and (iv) deactivating the master application, where only the master user can deactivate the master application.

18 Claims, 3 Drawing Sheets

Authorized User 1's Page

(56) References Cited

U.S. PATENT DOCUMENTS

| | | | | |
|---|---|---|---|---|
| 2012/0039507 | A1* | 2/2012 | Ikenoue | G06F 3/012 |
| | | | | 382/103 |
| 2012/0190459 | A1* | 7/2012 | Kobayashi | A63F 13/493 |
| | | | | 463/43 |
| 2013/0040604 | A1* | 2/2013 | Sprigg | H04L 51/12 |
| | | | | 455/410 |
| 2013/0040629 | A1* | 2/2013 | Sprigg | H04W 4/50 |
| | | | | 455/419 |
| 2014/0136607 | A1* | 5/2014 | Ou | H04L 67/18 |
| | | | | 709/203 |
| 2014/0283142 | A1* | 9/2014 | Shepherd | G06F 3/0482 |
| | | | | 726/30 |
| 2015/0150101 | A1* | 5/2015 | Novack | G07C 9/00111 |
| | | | | 726/7 |
| 2015/0350215 | A1* | 12/2015 | Shi | H04L 63/101 |
| | | | | 726/26 |
| 2016/0293134 | A1* | 10/2016 | Fortin | A63F 13/355 |
| 2016/0330078 | A1* | 11/2016 | Bostick | H04W 4/21 |

OTHER PUBLICATIONS

"Guideline on Windows 7 Parental controls", Version 1.0 published Jan. 2012 by Mauritian Computer Emergency Response Team.*
"How to Turn off Parental Controls on Windows 7" retrieved from Wayback Machine Archive dated Mar. 29, 2014.*

* cited by examiner

METHOD AND SYSTEM FOR CONTROL OF COMPUTING DEVICES

FIELD OF THE INVENTION

The present invention relates to methods and systems that control a user's access to and within computing devices and, more specifically, to a method and system for controlling a user's access to a specific subset of settings and programs found on a computing device.

BACKGROUND

Mobile and handheld computing devices are ubiquitous through most of the world. As of early 2013, for example, nearly 1 billion smartphones had been purchased worldwide. Increasingly, these mobile and handheld computing devices are utilized for services other than making phone calls, including storing and playing music, taking photographs, tracking motion, location, and activity, and playing games, among many other services. As a result, software applications for mobile and handheld computing devices are similarly ubiquitous. As of late 2014, for example, more than 100 billion mobile applications (also called "apps") had been downloaded worldwide. Total worldwide mobile app revenue has been nearly USD 35 billion, and is expected to continue to rise.

Although adults are the primary users of mobile and handheld computing devices, children are a growing market in the app industry. A recent survey concluded that more than 50% of all children ages 0-8 in the United States have access to a mobile device, while another study found that nearly 66% of children ages 4-7 had stated that they had used an iPhone® while riding in an automobile. Accordingly, children are increasingly exposed to and using mobile and handheld computing devices, and there are many thousands of apps that target children specifically.

Although apps targeted at children can be beneficial and educational, use of an adult's mobile or handheld computing device can introduce significant issues, including but not limited to: (i) accidental deletion of software; (ii) accidental relocation of items; (iii) changing of one or more settings; and (iv) access to inappropriate software. Young children, for example, while able to manipulate and navigate the devices quite well, do not readily grasp the differences between games and other more important items. Anything is interesting and worth exploring, and as a result anything can be lost or damaged. Children can easily reorder the app locations on the screen, open undesired apps, change settings, answer phone calls, send text messages, and/or delete voicemails or entire apps, among many other undesirable outcomes.

Unfortunately, most mobile and handheld computing devices do not come with a setting or settings that either prohibits a User's access to particular settings or programs, or that only allows access to particular settings or programs. Once a User has access to full operation of the mobile or handheld computing device, the User is essentially free to make any changes or access any program or option. Although some mobile computing devices can be retro-fitted with a device that blocks one or more buttons on the device (such as the "home" button on an iPhone), these devices are bulky and only keep a User locked into a single app. There is no way to quickly and easily switch between apps, or allow access to a subset of apps, when using these access-blocking devices.

Accordingly, there is a continued need for methods and systems that allow a User to switch between authorized apps while preventing access to non-authorized apps, settings, and other locations or programs within mobile and handheld computing devices.

SUMMARY OF THE INVENTION

The present disclosure is directed to methods and systems for limiting a user's access within a computing device to a specific subset of settings and programs found on that computing device. For example, the disclosure describes a method that allows a parent or caregiver to choose which apps a User may access, thereby allowing the User to launch only the apps approved for his or her use. This prevents the User from accessing apps that are not approved. The system or method allows the master user to establish multiple accounts, one for each authorized user, in which different sets of apps can be approved for different children.

Generally in one aspect, a method for limiting a user's access within a computing device to a specific subset of settings and programs found on that computing device includes the steps of: (i) activating a master application by a master user, where the master application allows access only to the specific subset of the plurality of software applications installed on the computing device, and further where the master application cannot be deactivated without authorization from the master user; (ii) accessing, from within the master application, one or more of the subset of software applications by an authorized user; and (iii) deactivating the master application by the master user.

According to an embodiment, the method also includes the step of installing the master application on the computing device.

According to an embodiment, the step of activating a master application by a master user comprises inputting a password.

According to an embodiment, the subset of the plurality of software applications is installed on a plurality of computing devices.

According to an embodiment, the method also includes the step of installing a deactivation device on the computing device.

According to an embodiment, the method also includes the step of viewing a list of the specific subset of the plurality of software applications.

In accordance with one aspect is a method for limiting a user's access to a specific subset of a plurality of software applications installed on a computing device, the method comprising the steps of: (i) receiving, at a master application, an activation command from a master user, wherein the master application allows access only to the specific subset of the plurality of software applications installed on the computing device; (ii) receiving, from an authorized user within the master application, a command to open one or more of the subset of software applications; and (iii) receiving, from an authorized user within the master application, a command to return to the master application or access a second of the subset of software applications; and (iv) receiving, from the master user within the master application, a command to deactivate the master application, wherein only the master user can deactivate the master application.

According to an embodiment, the activation command is a password.

According to an embodiment, the specific subset of the plurality of software applications is installed on a plurality of computing devices.

According to an embodiment, the method includes the step of receiving, from an authorized user within the master application, a command to view a list of the specific subset of the plurality of software applications.

According to an embodiment, the method includes the step of receiving, from the master user within the master application, a command to open a user profile.

According to an embodiment, the method includes the step of receiving, from the master user within the master application, a command to modify a user profile.

In accordance with one aspect is a method for limiting a user's access to a specific subset of a plurality of software applications installed on a computing device, the method comprising the steps of: (i) activating a master application by a master user, wherein the master application allows access only to the specific subset of the plurality of software applications installed on the computing device, and further wherein the master application cannot be deactivated without authorization from a master user; (ii) selecting, from within the master application, an authorized user profile within the master application; (iii) accessing, from within the selected authorized user profile, one or more of the subset of software applications by the authorized user; (iv) returning to a user interface of the master application; and (v) deactivating the master application, wherein only the master user can deactivate the master application.

According to an embodiment, the method includes the step of installing the master application on the computing device.

According to an embodiment, the step of activating a master application by a master user comprises inputting a password.

According to an embodiment, the specific subset of the plurality of software applications is installed on a plurality of computing devices.

According to an embodiment, the method includes the step of installing a deactivation device on the computing device.

According to an embodiment, the method includes the step of viewing a list of the specific subset of the plurality of software applications.

These and other aspects of the invention will be apparent from reference to the embodiments described hereinafter.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
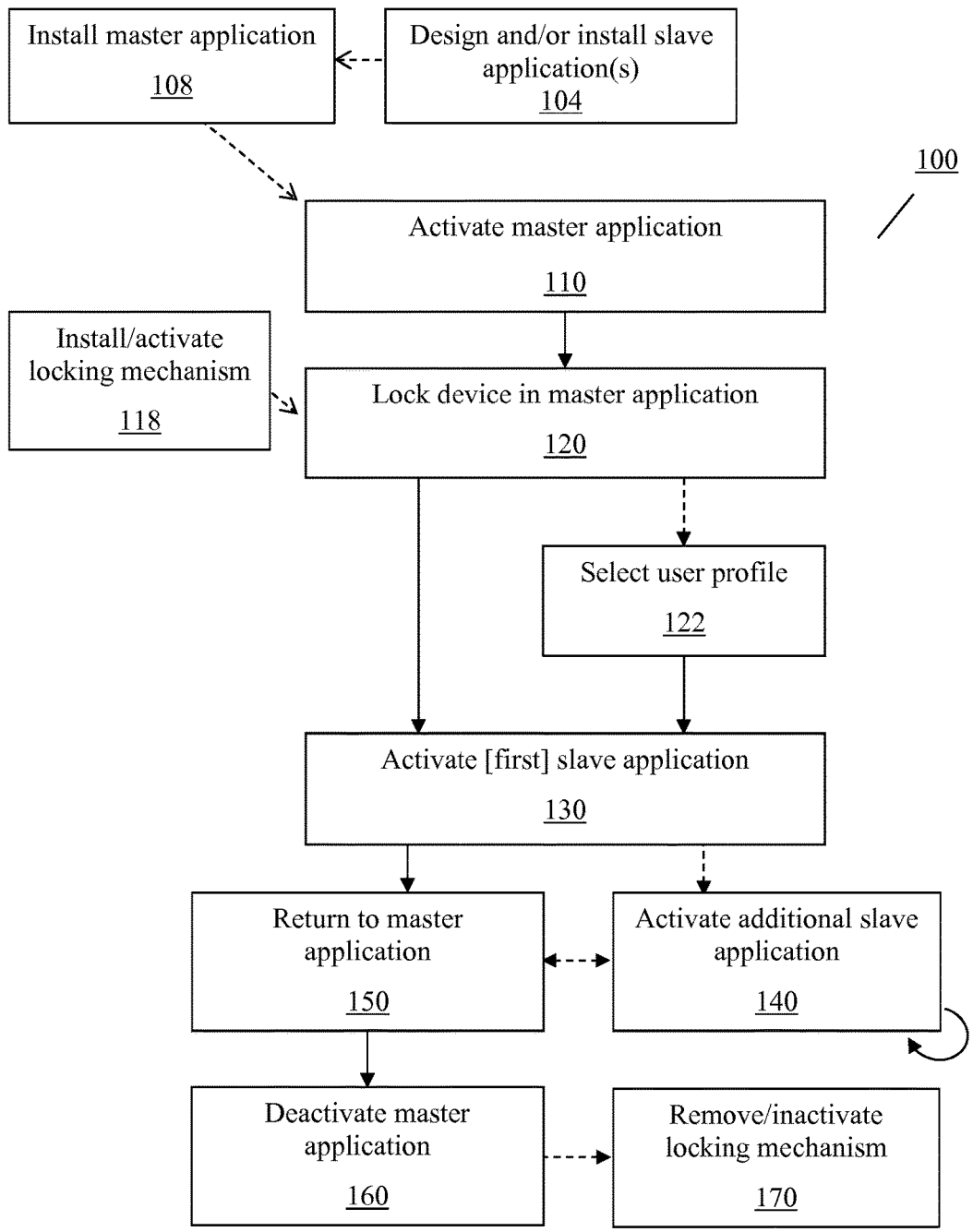
FIG. 1 is a flowchart of a method for controlling access to one or more software applications in accordance with an embodiment.

The present disclosure describes various embodiments of apparatus, systems, devices, and methods for limiting a user's access within a computing device to a specific subset of settings and programs found on that computing device. Referring to FIG. 1, in one embodiment, is a flowchart of a method 100 for limiting a user's access within a computing device to a specific subset of settings and programs. At step 110 of the method, a first user accesses and activates the master software application. The master application is a software program installed on a computing device, which can be a laptop, desktop, PDA, mobile or smartphone, tablet, wearable device, or any other computing device. The master application can function as simply as controlling access to other programs as described below, or it can include other functionality including scheduling, gaming, task management, or any of a variety of functions. Access to the master program may require a password, passcode, biometric input, or other security mechanism to prevent unauthorized users from accessing the program.

As an optional step 108 of the method, therefore, a user (which may be the first user or another user) installs the master application on the computing device. Installation can occur by downloading the software program from a database or storefront of programs, or can be loaded or uploaded from a CD, DVD, or other storage device or mechanism. The download and/or installation can occur for free, or can be behind a paywall or other restriction. The download and/or installation may also be age-dependent, or restricted by other characteristics such as whether the downloading user has been pre-authorized to download and/or install the program.

According to an embodiment, the system can be a multi-device system, with the master application installed on one, several, or all of the devices on the system. Alternatively, the master application can be located remotely, which will require internet, intranet, and/or other network access. For example, the master application can be located or configured remotely, and can interact with the user's device(s), or multiple users' devices, to complete one or more steps of method 100. As just one example, the master user can configure the master application settings remotely. Further, one or more of the slave applications, discussed below, may be located, hosted, or configured remotely, such as a cloud-based application.

At step 120 of the method in FIG. 1, the computing device is locked to operate only the master application, until a specific deactivation event occurs. For example, the first user can activate the master application and then let a second user—who is unable to trigger the specific deactivation event—use the computing device, knowing that only the master application can function. According to an embodiment, for example, the second user is a child who doesn't know, or is otherwise unable to trigger, the specific deactivation event.

According to one embodiment, the computing device is prevented from deactivating the master application due to the programming of the master application and/or the computing device. For example, the computing device may be programmed or configured to only deactivate programs, or certain programs, in response to a specific code, password, biometric measurement, or other trigger. As another example, the master software may be programmed or configured to take sufficient control of the device that the software cannot be deactivated without the appropriate trigger. This control may result from inherent programming of the computing device, or the computing device can be modified to allow the control. Some smartphones, for example, can be modified to allow a software program to exert sufficient control. Some smartphones also have settings that allow a single software program to exert control.

Some versions of iOS, for example, have "Guided Access" that limits the smartphone to a single app.

According to another embodiment, a physical change can occur to the computing device. For example, some mobile computing devices can be retro-fitted with a device that blocks one or more buttons on the device (such as the "home" button on an iPhone). This will lock the device into the software application. Accordingly, at optional step 118 of the method in FIG. 1, the locking mechanism can be installed or activated. For example, the button-blocking device can be put onto the computing device (or the device can be inserted into the button-blocking device). As another example, the programming or a setting of the computing device can be modified.

Once the master application is activated and the computing device is prevented from deactivating the app, other applications can be activated from within the master application. Accordingly, at step 130 of the method in FIG. 1, a slave application is activated from within the master application. For example, the user can be presented with a selection of one or more slave applications that can be activated, and the user can then move between these slave applications, all while operating within the restriction established by the master application. The selection of the slave application can occur by a table, menu, drop-down, search, query, or any of a variety of other methods. Clicking on, touching, or otherwise activating the slave application will cause the slave application to open.

If the slave application were to deactivate and allow access to the full functionality of the computing device, it would circumvent the restrictions of the master application. Accordingly, the slave application will be programmed, configured, or otherwise designed to only exit back into either another slave application, or into the master application. This can be as simple as changing settings in a pre-existing application to make it a slave application, or can involve re-programming of the pre-existing app to make it a slave app. Accordingly, the slave application will preferably have a mechanism such as a button, link, pull-down, or other mechanism to return to the master application interface. The slave application can also have an option to activate another slave application, although this is not a necessary feature. As one example of an embodiment, the slave application can have a "Return to Master App" button, similar to the home button or return button of a smartphone, where "Master App" is replaced by the name of the master application.

The availability of one or more slave applications can be determined based on the age, identity, or other characteristic of a user. Accordingly, the master application may be programmed or configured with the ability to have one or more profiles that can be selected, as shown in step 122 of the method in FIG. 1. For user A, for example, all slave applications might be available. The master user selects the profile for user A, and then user A is free to use all slave applications as he or she desires. As another example, user B may only be able to use slave applications with a sufficient rating, or only use pre-selected slave applications. The master user selects the profile for user B, and then user B is free to use any of the slave applications that have been pre-selected, and/or that satisfy the rating requirement. Many other options are possible. Preferably, selecting between profiles or removing a profile restriction, or changing a profile's settings, are done only by the master user. Accordingly, profile changes and profile switching can be limited by a password, passcode, biometric, or other security mechanism.

At optional step 140 of the method in FIG. 1, the user can switch to another slave mechanism. Accordingly, a slave application can have a button, link, or other way to move to another slave application. For example, the user interface may have a constant, periodic, or retrievable list of slave applications for which the user is authorized and which can be selected. As an example, a slave application may have a button that results in all possible slave applications to be presented on the screen to the user for selection. This step can be repeated multiple times, as the user is able to move freely between authorized slave applications, including the master application.

At step 150, the user navigates back to the master application. For example, as discussed above, each slave application can have a "Return to Master App" button, similar to the home button or return button of a smartphone, where "Master App" is replaced by the name of the master application. Once back to the master application, the master user can then deactivate the master application in step 160 of the method. This will involve a security input, which prevents the second or subsequent users from accidentally—or without permission—deactivating the master application. Deactivation can occur by inputting a code, password, biometric measurement, or through some other security input mechanism.

At optional step 160 of the method in FIG. 1, the master user can inactivate the locking mechanism. For some computing devices, this may occur automatically with the deactivation of the master application. As another example, the user can exit the setting or secondary program that allows the device to operate only the master application. As yet another example, the user can remove the locking device or apparatus that had been installed onto the computing device, or into which the computing device had been inserted.

Figure 2:
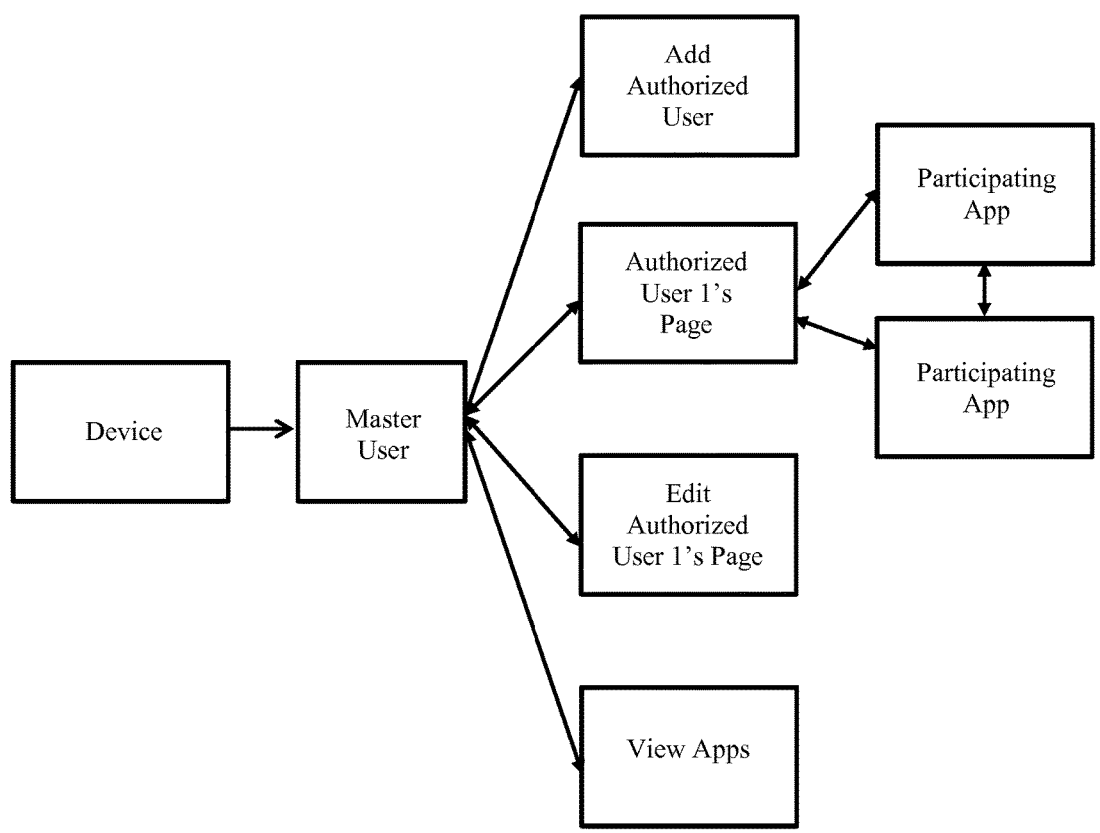
FIG. 2 is a schematic of the structure of a master user's access within the software application in accordance with an embodiment.
Figure 3:
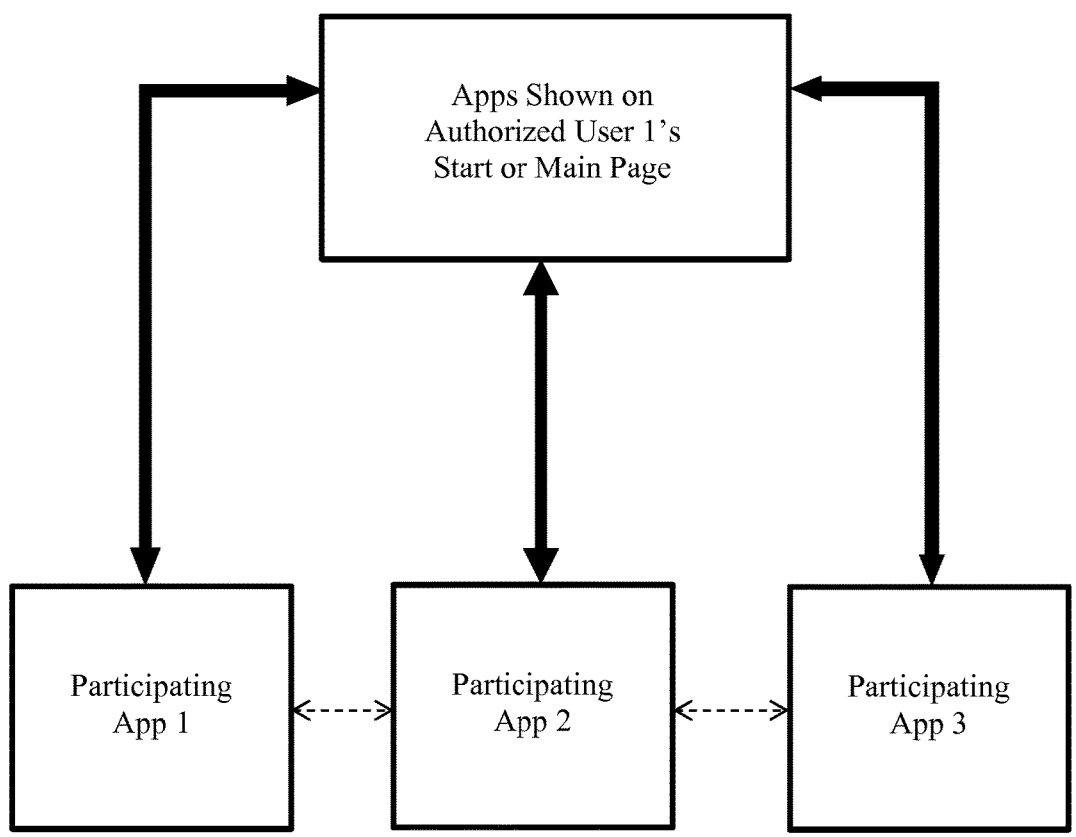
FIG. 3 is a schematic of the structure of a non-master user's access within the software application in accordance with an embodiment.

Accordingly, a schematic of the master user's access to and within the master application and slave applications might look similar to the schematic in FIG. 2, in which the master user ("Master User") has access to the master application and profiles. A schematic of the non-master's user's access to and within the master application and slave applications might look similar to the schematic in FIG. 3, in which the non-master user ("Authorized User 1") has a start or main page that gives him or her access to the authorized slave applications ("Participating App 1," "Participating App 2," and "Participating App 3"). Once Authorized User 1 enters into a Participating App, it can only exit back to the start or main page. Depending on the configuration and/or settings of the profile, master application, and two or more slave applications, Authorized User 1 may also be able to move between participating applications (denoted by the dashed lines in FIG. 3).

According to an embodiment, the master application may require integration and coordination with other applications and thus with other application developers. Each participating slave application, for example, might require a button, setting, link, or other mechanism to lead back to the master application. Accordingly, the systems and methods can include an online or mobile-accessible service whereby available participating app developers will be listed and categorized, such as via an online database and website that syncs with the computing device. Accordingly, other possible opportunities arise for further expansion of the services provided through the website. A number of services could potentially be added to enhance the user experience and add value to the website.

According to an embodiment, the method is utilized in an institutional, business, or other multi-user setting, where multiple users may use one device, one user may use multiple devices, and/or multiple users may use multiple devices. As just one example, a master application may be installed on all or a subset of the tablets, computers, or other devices used by children in the hospital. The tablets or other devices can then be distributed to the children to use without the children being able to access unauthorized applications. As another example, the master application can be programmed with or can be used to create, modify, or control a single user account for children ages 0-5, another user account for 6-10, and so on. Alternatively, the master application can be programmed with or can be used to create, modify, or control an individual user account for each bed, each room, and/or each patient, among many other possible configurations.

An accompanying website and/or database of participating slave applications, for example, can be programmed or configured to automatically sync with the app on the mobile device to allow for easy notification of any new developments, such as newly added participating apps. It can also provide master users, such as parents and caregivers, with catalogued database of participating apps to allow easy searching and filtering, thereby allowing the master user to quickly and easily find the desired app for each user. The accompanying website and/or database can also provide the master user with a rating and ranking system of participating apps that enables that user to easily assess usability and appeal for subsequent users such as children. Among other functionality, the website can provide a location for developers to promote their apps for children with better cataloguing and searching ability within the database, and can provide parents and caregivers with FTC-compliant disclosures for each app to ensure that parents or caregivers are informed about the information-collecting capabilities of all participating apps. The website may also provide a way for parents to preview and try the apps contained within the database, provide an easy-purchase function that will lead parents directly to a webpage, store, or database to purchase and download the desired app, and can provide a way for parents to set and monitor an account for each User for in-app purchases. As yet another example, as educational material becomes increasingly available via electronic media, the possibility may arise to create an educational hub where parents can manage and monitor the User's educational activity.

An access website can have options for modifying one or more profiles. For example, the master user page (here, "Master User") can list profiles and the apps associated with each profile. An "edit" link or button will open an "Edit User's Page" where Master User will be able to add or remove apps for "Authorized User 1" or "Authorized User 2." Each authorized user's page will be limited to the apps chosen for him or her by Master User. "OPEN (authorized user's) page will allow Master User to open the desired Authorized User's page of desired apps in a secure environment so that the Authorized User can access the chosen apps without accessing any other part of the device. "VIEW Newly Participating Apps" will allow Master User to view a list of newly added participating apps. It can also take Master User to links where she can access a database of all participating apps and view reviews and ratings of the participating apps. The database can be searchable via many data fields. "ADD Another Authorized User" will open a field to allow Master User to add another user. Master User will then be able to customize the page for that user by choosing which apps that user will be allowed to access via "Authorized User's Page." Similarly, an authorized user's page can display all of the apps chosen by the caregiver for this user. The app icon will open the desired app. Once in another app, there will be an icon to return to the "Authorized User's Page."

Rather than accessing and making changes to basic operations of the device, the inventive methods and systems described or otherwise envisioned herein provide a secure environment by creating a "circle of slave applications" that lead back only onto or among themselves. Thus, the basic operations of the device can be controlled by devices that are external to the software, including Guided Access, "airplane mode," toddler cases, physical home button blockers, and many more. Thus, the invention is particularly beneficial where accessing or altering the basic operations of the operating system is not preferable or not allowed. Existing methods, for example, lock down the device from within the operating system, while the inventive methods and systems provide the same services without controlling the device from within its operating system. As a result, the inventive methods and systems can be utilized on a wide variety of operating systems (including the Internet) and can use a variety of methods to secure the device. The method only requires that the participating apps, websites, or other participating entity (i.e., slave software) link only back to the master.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

What is claimed is:

1. A method for limiting a user's access to a specific subset of a plurality of software applications installed on a computing device, the method comprising the steps of:

modifying, by a master user, a setting of an operating system of the computing device to change a mode of the operating system from a first mode to a second mode, wherein during the first mode any of the plurality of software applications may be accessed, and wherein only in the second mode, a master user may designate only one of any of the plurality of software applications as a master application when no other of the plurality of software applications are currently designated as the master application;

authenticating, by the operating system, the master user, in the second mode, activating the designated master application by the authenticated master user, wherein the operating system restricts the activating to being performed by only the authenticated master user, wherein the activated master application allows access only to the specific subset of the plurality of software applications installed on the computing device, wherein the activated master application provides a method for an authorized user to select and activate one of any of the specific subset of the plurality of software applications as an activated slave application, and further wherein the activated master application cannot be deactivated without authorization from the authenticated master user, and further wherein the authorized user of the computing device cannot exit from within the master application once the master application is activated, and cannot access any application on the computing device other than the specific subset of software applications once the master application is activated, wherein each of the software applications in the specific subset of the plurality of software applications is specially pre-programmed to exit and return to a particular, pre-defined one of the plurality of software applications via selection of a navigation button so indicated, such that when the authorized user selects the navigation button while using the activated slave application and the activated master application is the particular one of the plurality of software applications, the activated slave application exits to the activated master application and becomes deactivated such that a user can exit any of the plurality of software applications to another of the plurality of software applications if the master application is not activated, but can only exit from the software application to the master application once the master application is activated;

presenting to the authorized user from within the master application, a specific subset of the plurality of software applications installed on the computing device, wherein the authorized user is pre-authorized to access each of the applications in the specific subset;

receiving, from the authorized user, a selection of a first one of the subset of software applications in the specific subset, receiving, from the authorized user, a command to close the selected first one of the subset of software applications;

in response to the close command, returning directly to the specific subset of the plurality of software applications installed on the computing device; and deactivating, by the master user, the master application, wherein only the master user can deactivate the master application;

wherein the specific subset is less than all the software applications installed on the computing device.

2. The method of claim 1, further comprising the step of installing the master application on the computing device.

3. The method of claim 1, wherein the step of activating the master application by a master user comprises inputting a password.

4. The method of claim 1, wherein the computing device is a smartphone.

5. The method of claim 1, wherein the computing device is a tablet.

6. The method of claim 1, wherein the specific subset of the plurality of software applications are installed on a plurality of computing devices.

7. The method of claim 1, further comprising the step of installing a deactivation device on the computing device.

8. A method for limiting a user's access to a specific subset of a plurality of software applications installed on a computing device, the method comprising the steps of:

receiving instructions to modify a setting of an operating system of the computing device to change a mode of the operating system from a first mode to a second mode, wherein during the first mode any of the plurality of software applications may be accessed, and wherein only in the second mode, a master user may designate only one of any of the plurality of software applications as the master application when no other of the plurality of software applications are currently designated as the master application;

authenticating, by the operating system, the master user, receiving instructions in the second mode to activate the designated master application, wherein the operating system restricts the activating to being performed by only the authenticated master user, and wherein the activated master application allows access only to the specific subset of the plurality of software applications installed on the computing device, and wherein the activated master application provides a method for an authorized user to select and activate one of any of the specific subset of the plurality of software applications as an activated slave application, and further wherein the activated master application cannot be deactivated without authorization from the authenticated master user, and further wherein the authorized user of the computing device cannot exit from within the master application once the master application is activated, and cannot access any application on the computing device other than the specific subset of software applications once the master application is activated, wherein each of the software applications in the specific subset of the plurality of software applications is specially pre-programmed to exit and return to a particular, pre-defined one of the plurality of software applications via selection of a navigation button so indicated, such that when the authorized user selects the navigation button while using the activated slave application and the activated master application is the particular one of the plurality of software applications, the activated slave application exits to the activated master application and becomes deactivated such that a user can exit any of the plurality of software applications to another of the plurality of software applications if the master application is not activated, but can only exit from the software application to the master application once the master application is activated;

presenting to the authorized user from within the master application, a list of the specific subset of the plurality of software applications installed on the computing device, wherein the authorized user is pre-authorized to access each of the applications in the specific subset;

receiving, from the authorized user, a selection of a first one of the subset of software applications;

receiving, from the authorized user, a command to close the selected first one of the subset of software applications in the specific subset;

returning, in response to the close command, directly to the specific subset of the plurality of software applications installed on the computing device; and receiving, from the master user within the master application, a command to deactivate the master application, wherein only the master user can deactivate the master application;

wherein the specific subset is less than all the software applications installed on the computing device.

9. The method of claim 8, wherein the activation command is a password.

10. The method of claim 8, wherein the specific subset of the plurality of software applications are installed on a plurality of computing devices.

11. The method of claim 8, further comprising the step of receiving, from the master user within the master application, a command to open a user profile.

12. The method of claim 8, further comprising the step of receiving, from the master user within the master application, a command to modify a user profile.

13. A method for limiting a user's access to a specific subset of a plurality of software applications installed on a computing device, the method comprising the steps of:

modifying, by a master user, a physical configuration of the computing device to change a mode of the computing device from a first mode to a second mode, wherein during the first mode any of the plurality of software applications may be accessed, and wherein only in the second mode, a master user may designate only one of any of the plurality of software applications as a master application when no other of the plurality of software applications are currently designated as the master application;

authenticating, by an operating system of the computing device, the master user, in the second mode, activating the designated master application by the authenticated master user, wherein the operating system restricts the activating to being performed by only the authenticated master user, wherein the master application allows access only to the specific subset of the plurality of software applications installed on the computing device, wherein the activated master application provides a method for an authorized user to select and activate one of any of the specific subset of the plurality of software applications as an activated slave application, and further wherein the activated master application cannot be deactivated without authorization from the authenticated master user, and further wherein the authorized user of the computing device cannot exit from within the master application once the master application is activated, and cannot access any application on the computing device other than the specific subset of software applications once the master application is activated;

wherein each of the software applications in the specific subset of the plurality of software applications is specially pre-programmed to exit and return to a particular, pre-defined one of the plurality of software applications via a selection of a navigation button so indicated, such that when the authorized user selects the navigation button while using the activated slave application and the activated master application is the particular one of the plurality of software applications, the activated slave application exits to the activated master application and becomes deactivated, such that a user can exit any of the plurality of software applications the to another of the plurality of software applications if the master application is not activated, but can only exit from the software application to the master application or one of the other software applications in the specific subset once the master application is activated;

presenting to the authorized user from within the master application, a specific subset of the plurality of software applications installed on the computing device, wherein the authorized user is pre-authorized to access each of the applications in the specific subset;

receiving, from the authorized user, a selection of a first one of the subset of software applications in the specific subset;

receiving, from the authorized user, a command to close the selected first one of the subset of software applications;

returning, in response to the close command, directly to the specific subset of the plurality of software applications installed on the computing device; and deactivating the master application, wherein only the master user can deactivate the master application;

wherein the specific subset is less than all the software applications installed on the computing device.

14. The method of claim 13, further comprising the step of installing the master application on the computing device.

15. The method of claim 13, wherein the step of activating the master application by a master user comprises inputting a password.

16. The method of claim 1, wherein the specific subset of the plurality of software applications are installed on a plurality of computing devices.

17. The method of claim 1, further comprising the step of installing a deactivation device on the computing device.

18. A method for limiting a user's access to a specific subset of a plurality of software applications installed on a computing device, the method comprising the steps of:

modifying, by a master user, a setting of an operating system of the computing device to change a mode of the operating system from a first mode to a second mode, wherein during the first mode any of the plurality of software applications may be accessed, and wherein only in the second mode, a master user may designate only one of any of the plurality of software applications as a master application when no other of the plurality of software applications are currently designated as the master application;

in the second mode, activating the designated master application by the master user, wherein the operating system restricts the activating to being performed by only the master user, wherein the activated master application allows access only to the specific subset of the plurality of software applications installed on the computing device, wherein the activated master application provides a method for an authorized user to select and activate one of any of the specific subset of the plurality of software applications as an activated slave application, and further wherein the activated master application cannot be deactivated without authorization from the master user, and further wherein the authorized user of the computing device cannot exit from within the master application once the master application is activated, and cannot access any application on the computing device other than the specific subset of software applications once the master application is activated, wherein each of the software applications in the specific subset of the plurality of software applications is specially pre-programmed to exit and return to a particular, pre-defined one of the plurality of software applications via selection of a navigation button so indicated, such that when the authorized user selects the navigation button while using the activated slave application and the activated master application is the particular one of the plurality of software applications, the activated slave application exits to the activated master application and becomes deactivated such that a user can exit any of the plurality of software applications to another of the plurality of software applications if the master application is not activated, but can only exit from the software application to the master application once the master application is activated;

presenting to the authorized user from within the master application, a specific subset of the plurality of software applications installed on the computing device, wherein the authorized user is pre-authorized to access each of the applications in the list;

receiving, from the authorized user, a selection of a first one of the subset of software applications in the specific subset, receiving, from the authorized user, a command to close the selected first one of the subset of software applications;

in response to the close command, returning directly to the specific subset of the plurality of software applications installed on the computing device; and deactivating, by the master user, the master application, wherein only the master user can deactivate the master application;

wherein the specific subset is less than all the software applications installed on the computing device.

* * * * *